United States Patent [19]
Dräger

[11] Patent Number: 6,138,997
[45] Date of Patent: Oct. 31, 2000

[54] PISTON-CYLINDER ARRANGEMENT

[75] Inventor: Eberhard Dräger, Emmendingen, Germany

[73] Assignee: Enidine GmbH, Bad Bellingen-Rheinweiller, Germany

[21] Appl. No.: 09/153,182

[22] Filed: Sep. 16, 1998

[30] Foreign Application Priority Data

Sep. 18, 1997 [DE] Germany .............. 197 40 990

[51] Int. Cl.$^7$ ...................................... F16F 7/00
[52] U.S. Cl. ........................... 267/136; 267/64.28
[58] Field of Search .................. 267/136, 64.19, 267/64.16, 64.15, 64.17, 64.18, 64.28; 188/322.16, 322.17, 322.18, 322.19; 280/275, 276

[56] References Cited

U.S. PATENT DOCUMENTS

| | | | |
|---|---|---|---|
| 3,687,483 | 8/1972 | Gull et al. ............... | 267/64.16 X |
| 5,188,728 | 2/1993 | Traonvoez et al. ......... | 267/282 X |
| 5,380,026 | 1/1995 | Robinson ................ | 267/226 X |
| 5,521,497 | 5/1996 | Gull et al. ............... | 267/64.19 X |

FOREIGN PATENT DOCUMENTS

GM 79 07 559 U1 8/1979 Germany .
296 06 256 U1 8/1996 Germany .

OTHER PUBLICATIONS

Edgar Schatz, Werner Nagel, Uwe Grigo, "Neues Längenmesssystem zum Einbau in Hydraulikzylinder", O+P Ölhydraulik und Pneumatik, 36 (10): 656–657 (1992).

*Primary Examiner*—Michael Mar
*Assistant Examiner*—Melanie Talavera
*Attorney, Agent, or Firm*—Akin, Gump, Strauss, Hauer & Feld, L.L.P.

[57] ABSTRACT

A piston-cylinder arrangement, in particular a shock absorber (1), has a housing (2) as well as a piston (3) guided therein and pushed against a damping medium, and on which a piston rod (5) acts. The shock absorber has a screw-in-plug (10), within which a position transmitter (19), constructed as a proximity sensor, is housed. The screw-in plug with the proximity sensor (19) located therein and evaluation electronics are arranged coaxially on the rear end of the shock absorber housing (2). The piston is connected on the rear end to a magnet (15), and the proximity sensor is constructed of at least one magnetic field-dependent sensor.

20 Claims, 2 Drawing Sheets

PISTON-CYLINDER ARRANGEMENT

BACKGROUND OF THE INVENTION

The invention involves a piston-cylinder arrangement, in particular a shock absorber, having a housing as well as a piston guided therein and pushed against a damping medium, and on which a piston rod acts, and having an oil filling and draining plug, constructed as a screw-in plug, within which a position transmitter, constructed as a proximity sensor, is housed.

Such shock absorbers are used, for example, in connection with positioning drives or linear units in order to be able to approach defined or fixed positions, for example the end position, in an exact manner. The proximity sensor thereby serves for monitoring the position to be approached and generates an electric signal upon reaching this position, which signal can be used for the control, in particular for switching off, the positioning drive.

In previously known shock absorbers the position transmitters are customarily applied as a surface mount or attachment, which can require a considerable construction expense and above all increases to a significant degree the space requirement necessary for the shock absorber. Even with small design shapes of the shock absorber, this acts in an especially disadvantageous manner.

SUMMARY OF THE INVENTION

Thus, an object of the invention is to create a piston-cylinder arrangement of the type mentioned at the outset, which makes possible a very compact construction and which has a high operational safety.

The object of the invention is achieved in the piston-cylinder arrangement of the type mentioned at the outset in that the oil filling and draining plug, constructed as a screw-in plug, with the proximity sensor located in it, is arranged coaxially on the rear end of the shock absorber housing, that the piston is connected to a magnet on the rear side, and that the proximity sensor comprises at least one magnetic field-dependent sensor.

In this way, very slender shock absorbers can be made having integrated proximity sensors which can also be used under very tight spatial proportions. It is especially advantageous in this regard if in the screw-in plug, in addition to the proximity sensor, evaluation electronics and preferably electrical plug connections are housed, and if the screw-in plug has a receiving area, separated from the interior space of the shock absorber by a separating wall, preferably for a plate carrying the evaluation electronics and the proximity sensor.

The screw-in plug with the proximity sensor located in it and the evaluation electronics thus form a structural unit, so that the shock absorber and sensor device can be replaced easily and quickly, independently of each other, if need be.

A further embodiment of the invention, for which the automatic sensor is required, provides that a magnetoresistive sensor is provided as a magnetic field-dependent sensor.

Such a sensor has, among other things, a high responsivity which is a factor of 10 to 100 better than other a magnet field-depedendent sensors. Magnetoresistive sensors can also be manufactured in a very cost-effective manner, so that their use in a shock absorber only affects the price insignificantly. It is especially advantageous if the magnetoresistive sensor is arranged in order to evaluate the direction of the magnetic field.

The sensor thereby operates independently of the magnetic field strength, so that changes of the magnetic force, for example by the influence of temperature, do not act in a disadvantageous manner on the planned response position of the piston.

With direct use of a magnetoresistive sensor in connection with a shock absorber, a series of quite considerable advantages result. Most of all in this regard, the shock absorber or the like can be used even under severe environmental conditions, without the response precision of the position recognition being harmed thereby.

With a magnetoresistive sensor for the evaluation of the magnetic field direction, it is expedient if the magnet connected to the piston is guided axially and if the magnetoresistive sensor is arranged laterally displaced from the axial alignment direction.

In this manner, there is an exact coordination between the sensor and the guide path of the magnet. Depending on the arrangement of the sensor, it responds when field lines penetrate at a certain angle. This is the case if the magnet and the sensor, which is laterally displaced from the alignment direction or from the movement direction of the magnet, have approached each other to a position which corresponds to this.

It is especially advantageous if the magnetoresistive sensor is adjusted in its position at the planned switching position of the magnet in such a way that the sensor output voltage is located at a zero crossing or is approximately zero.

This also contributes to an exact positioning since, in this case, the switching point is independent of the amplitude of the output signal. Copy scatterings of the sensor with regard to its output voltage thus do not act in such a disadvantageous manner.

It is thus also advantageous that the evaluation electronics for detecting and evaluating a zero crossing of the sensor output voltage can be constructed very simply and essentially only require one comparator.

According to a further embodiment of the invention, several magnetoresistive sensors can also be provided for detecting different positions of the piston and the like within the travel path of the piston.

In this manner, several switching points at different piston positions can be detected within the travel path of the piston or the piston rod connected to it, for example the run-in and run-out end positions, and if need be, intermediate positions as well. Also, the possibility thereby results for generating a preliminary signal before an end position, for example in order to be able to switch over from overdrive to crawling speed for a linear drive.

Another advantageous embodiment of the invention provides that, with several magnetoresistive sensors, the evaluation electronics have a device for measuring the runtime of the piston between the different piston positions.

From one such measurement conclusions may be made about the operating condition of the shock absorber or the like. In particular, a monitoring is thereby possible, and damage to the damper, for example by oil loss, or a monitoring of the load condition can be recognized in this manner.

Additional embodiments of the invention are set forth in the additional dependent claims.

BRIEF DESCRIPTION OF THE DRAWINGS

In the following, the invention is explained more thoroughly in its essential details on the basis of the drawings. Shown are.

DETAILED DESCRIPTION OF THE INVENTION

Figure 1:
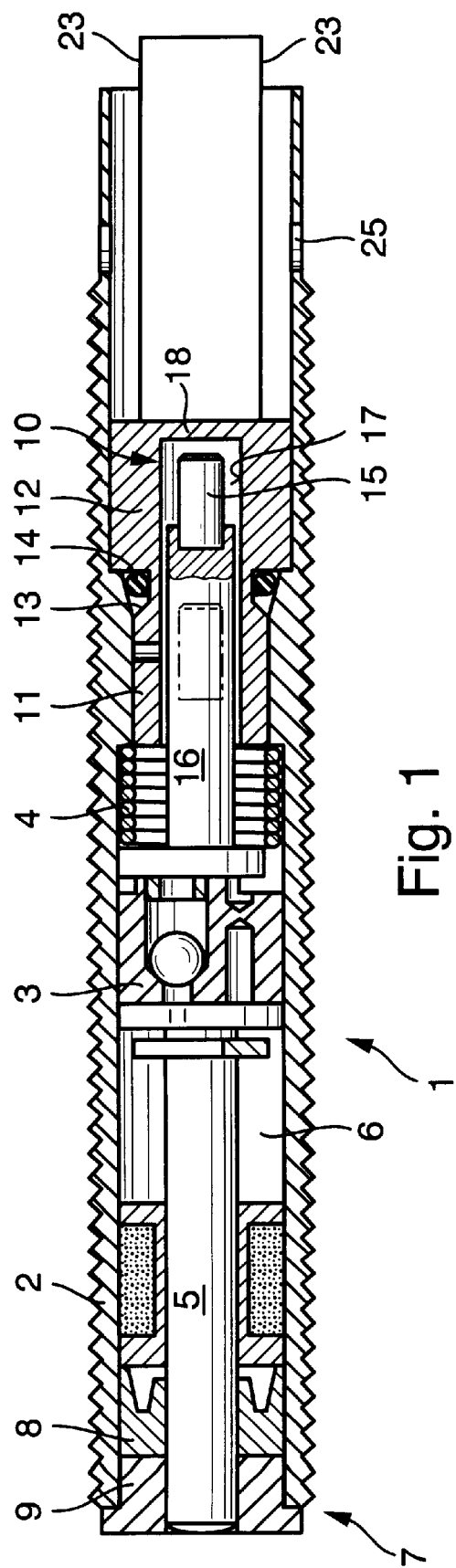
FIG. 1 is a longitudinal sectional representation of a shock absorber.

A shock absorber 1, shown in FIG. 1, serves for example, for limiting the travel path of a linear device. It has an outer housing 2 in which a damper piston 3 is set so that it can be moved. In FIG. 1 the piston is located in the run-in end position. It is impinged on the rear side by a compression spring 4 in the run-out direction. The shock absorber interior space 6, in which the piston 3 moves, is filled with oil, in order to obtain a damping effect in connection with overflow canals within the piston as well as the compression spring 4. The piston 3 is connected to a piston rod 5, through which a force acting from an object to be damped is transferred to the piston. The interior space 6 is sealed on the front end 7 of the shock absorber by a seal 8, which is supported against a closing ring 9, and is limited on the inner end by a screw-in plug 10.

The screw-in plug 10 also forms, at the same time, an oil filling and draining plug. The screw-in plug 10 has on its inner end a screw-in threading 11, onto which a plug section 12 having a slightly larger outer diameter connects. In the intermediate area between the plug section 12 and screw-in threading section, a screw-in stop is formed by the shoulder, and next to this is located a ring groove 13 to receive a sealing ring 14.

The shock absorber 1 is equipped with a device for position querying of the piston or the piston rod. An electric signal can be generated thereby, for a position that can be pre-planned, and with the signal additional functions can be activated in a control. For example, when reaching a predetermined position and response of a sensor, the switching off of a linear drive can occur. For this purpose can be used a magnetic field-dependent sensor, which can be activated by a magnet 15 connected to the damper piston 3.

In FIG. 1 it is easily recognized that this magnet 15 is located on the rear, free end of a bar-shaped, coaxially-running support component 16, which is connected its other end to the piston 3. The magnet support component 16 inmerses more or less, depending on the position of the piston, into an inner drill hole 17 of the screw-in plug 10, wherein this inner drill hole is constructed as a pocket hole and is limited on the rear end by a separating wall 18.

Figure 3:
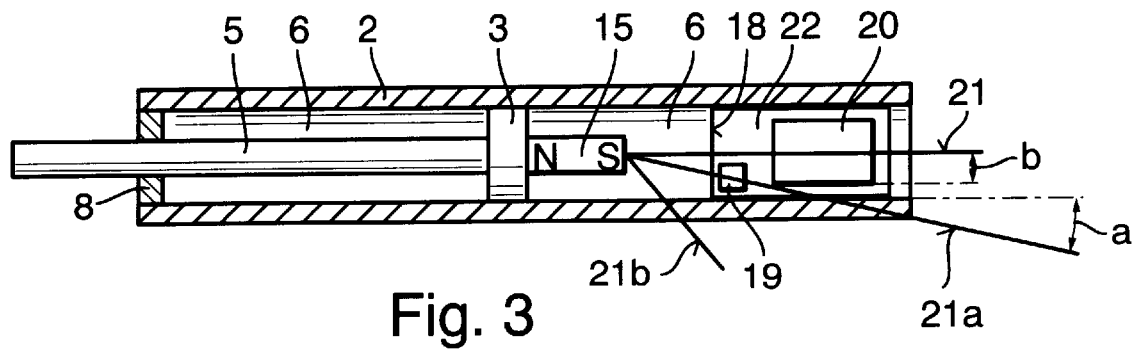
FIG. 3 is a schematic diagram of a shock absorber in the run-out position with the integrated sensor device.
Figure 4:
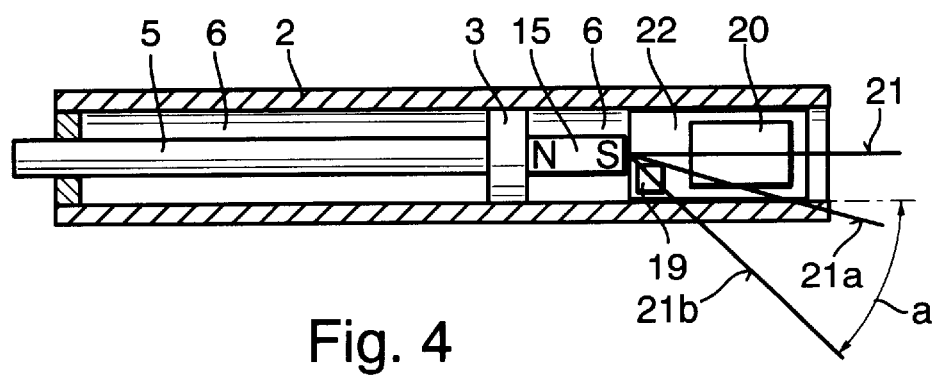
FIG. 4 is a diagram corresponding approximately to FIG. 3, here however with the shock absorber in the run-in position.

In FIGS. 3 and 4, the shock absorber 1 is depicted schematically, where FIG. 3 shows a run-out position of the piston 3 with the piston rod 5, and FIG. 4 shows a run-in end position. In the rear end area and outside of the interior space 6 filled with oil, a sensor 19 is shown to one side, and next to it evaluation electronics 20 are shown located on a plate 22.

Preferably, a magnetoresistive sensor is used here, which sensor is provided for evaluating the direction of the magnetic field.

Such a magnetoresistive sensor 19 can be arranged in such a way that its output voltage assumes a certain value at a certain angle of a magnetic field which penetrates it.

Figure 5:
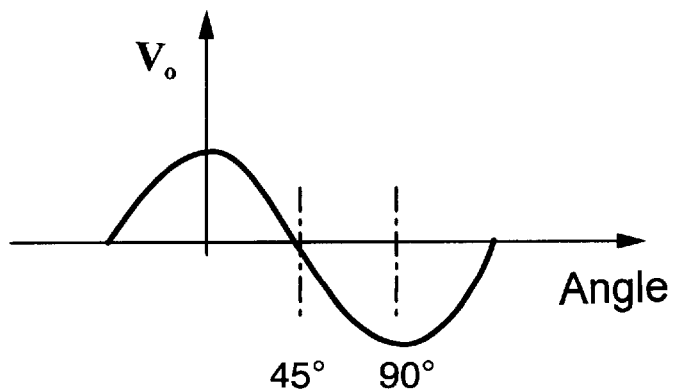
FIG. 5 is a graph of the output voltage progression of a magnetoresistive sensor.

In FIG. 5, the progression of the output voltage versus the angle of a magnetic field penetrating the sensor is plotted. This angle is relative to a certain sensor edge. In the case depicted here, the sensor 19 is thus arranged relative to the magnet 15 in such a way that its output voltage $V_o$ takes on its maximum at a field line passage of 0°, 90°, as well as multiples of that, and its minimum value occurs in between at the respective zero crossings through the abscissa in between, at 45°, 135°, etc.

As can be easily recognized in FIGS. 3 and 4, the magnetoresistive sensor 19 is arranged displaced from the axial alignment direction of the magnet. The lateral displacement from the center line is indicated in FIG. 3 by b. In the rotational direction, it is aligned in such a way that when field lines pass through which emerge from the magnet 15 at approximately 45° and penetrate the sensor, the output voltage of the sensor is approximately zero.

In FIGS. 3 and 4, three field lines 21, 21a, 21b are indicated. The field line 21 runs in a straight extension of the longitudinal extension of the magnet, while the field line 21a runs displaced with respect to the field line 21 at a certain angle, for example 20°, and the field line 21b in the end position runs approximately at an angle of 45° to the longitudinal extension of the magnet. In the run-out position of the piston 3 with piston rod 5 shown in FIG. 3, the sensor 19 is penetrated approximately at an angle a by field line 21a running diagonally at approximately 20°. If the piston rod 5 is now run in, then the magnet 15 also approaches the sensor until the field line 21b in the end position causes the output voltage of the sensor to be approximately at zero. This zero crossing can be recognized in FIG. 5 at the 45° mark.

The positioning of the sensor in such a way that its output voltage is zero when the magnet 15 is located in the switching position, for example in the run-in position of the piston, has the essential advantage that for detecting the zero crossing only a slight electronic expenditure is necessary. This is managed in practice by using a comparator for the evaluation electronics. Only a very small spatial requirement is thereby now necessary. The evaluation electronics 20 as well as the sensor 19 are located on a small plate 22, which is implemented in the rear side area of the shock absorber outer housing 2. By the allocation of the switching point to a zero crossing of the sensor output voltage, the maximum amplitude of the sensor does not have any effect, so that accordingly, copy scatterings cannot have any negative effects as well.

For the plate 22 with the evaluation electronics 20 and the sensor 19, a receiving area is provided on the rear end of the shock absorber outer housing 2, as already mentioned.

The entire sensor and measuring unit is housed in the screw-in plug 10, which functions as an oil filling and draining plug. On the rear side of the plug section 12 (see FIG. 1), the screw-in plug 10 is constructed in a slotted manner to receive the plate 22. The plate can be introduced here and is attached together with an electric connection socket on the rear end by casting with plastic, preferably transparent plastic. The screw-in plug 10 thus forms a complete structural unit together with the sensor 19 of the evaluation electronics 20 and a plug connector (connection socket) not shown here. Since the screw-in plug 10 is detachably connected to the remaining shock absorber, the structural units can be separated from each other easily and quickly, so that a simple exchange is possible.

Figure 2:
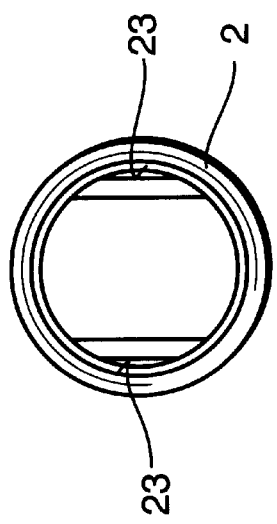
FIG. 2 is a rear end view of the shock absorber shown in FIG. 1.

In FIG. 2 it is easy to recognize that the screw-in plug is arranged with its structural parts coaxial to the rear end of the shock absorber housing 2. By this coaxial arrangement, a very slender structural form of the entire shock absorber is possible, and thus also a placement under tight spatial proportions. For example, shock absorbers can thereby be made which have a constant outer diameter of 10 mm. The screw-in plug 10 is made of a magnetically non-conducting material, preferably aluminum, in order not to affect the measuring sensitivity in a disadvantageous way, and also particularly in order not to dampen too greatly the penetration of the magnetic field through the separating wall 18.

The screw-in plug 10 can even have lateral penetration openings 25 which function as viewing openings and through which the switching status can be displayed optically by one or more light-emitting diodes on the plate.

The screw-in plug 10 projects somewhat beyond the housing 2 with its rear end, and contact positions 23 for a turning tool are provided in this area (FIGS. 1 and 2).

Also to be mentioned is that several magnetoresistive sensors responding to different field directions and/or several sensors, having the same orientation and displaced from each other in the longitudinal direction, can be provided. Thus, several switching points, i.e. different positions of the piston 3, can be monitored. There exists thereby, additionally or also in combination, the possibility for detecting the travel speed by expanding the evaluation device with a measurement device for the runtime of the piston between the different piston positions, from which conclusions are possible on whether the shock absorber is working properly, for example whether an oil loss has occurred. On the other hand, excess loading situations can also be registered by this.

What is claimed is:

1. Piston-cylinder arrangement, in particular a shock absorber (1), having a housing (2) as well as a piston (3), which is guided therein and pushed against a damping medium and on which a piston rod (5) acts, the piston-cylinder arrangement having an oil filling and draining plug (10), constructed as a screw-in plug, within which a position transmitter (19), constructed as a proximity sensor, is housed, characterized in that, the oil filling and draining plug, constructed as a screw-in plug with the proximity sensor (19) located therein, is arranged coaxially on the rear end of the shock absorber housing (2) having a rear end extension with a screw-in opening lying inside it for the screw-in plug, that the piston is connected on the rear end to a magnet (15), and that the proximity sensor comprises at least one magnetic field-dependent sensor arranged for evaluating the direction of the magnetic field.

2. Piston-cylinder arrangement according to claim 1, characterized in that in the screw-in plug (10), in addition to the proximity sensor (19), evaluation electronics (20) are housed, and that the screw-in plug has a receiving area, separated from the interior space of the shock absorber by a separating wall (18), for a plate carrying the evaluation electronics and the proximity sensor.

3. Piston-cylinder arrangement according to claim 1, characterized in that the screw-in plug has in its receiving area a longitudinal slot for receiving a plate carrying evaluation electronics and the proximity sensor and that the plate is cast and connected with the screw-in plug.

4. Piston-cylinder arrangement according to claim 2, characterized in that the electric plug connection is constructed as a connection socket and is arranged on the outer end of the screw-in support and is preferably cast with the screw-in plug or the plate.

5. Piston and cylinder arrangement according to claim 2, characterized in that the evaluation electronics for the response signaling have one or more light-emitting diodes, and that the screw-in-plug or the connection socket has at least one viewing opening filled with transparent plastic.

6. Piston-cylinder arrangement according to claim 1, characterized in that a magnetoresistive sensor is provided as a magnetic field-dependent sensor.

7. Piston-cylinder arrangement according to claim 6, characterized in that the magnet connected to the piston is guided axially, and that the magnetoresistive sensor is arranged laterally displaced from the axial alignment direction.

8. Piston-cylinder arrangement according to claim 6, characterized in that the position of the magnetoresistive sensor is adjusted to the planned switching position of the magnet, so that the sensor output voltage is located approximately at a zero crossing.

9. Piston-cylinder arrangement according to claim 6, characterized in that the position of the magnetoresistive sensor is adjusted to the planned switching position of the magnet, so that a response of the magnetoresistive sensor occurs for a magnetic field direction of approximately 45°.

10. Piston-cylinder arrangement according to claim 2, characterized in that the evaluation electronics have a comparator for detecting and evaluating a zero crossing of the sensor output voltage.

11. Piston-cylinder arrangement according to claim 6, characterized in that several magnetoresistive sensors responding to different field directions or several sensors, having the same orientation and displaced from each other in the longitudinal direction, are provided.

12. Piston-cylinder arrangement according to claim 6, characterized in that several magnetoresistive sensors are provided for detecting different positions of the piston within the travel path of the piston.

13. Piston-cylinder arrangement according to claim 12, characterized in that for several magnetoresistive sensors the evaluation electronics have a device for measuring the runtime of the piston between the different piston positions.

14. Piston-cylinder arrangement according to claim 12, characterized in that several magnetoresistive sensors form a structural unit and are preferably are housed on a common chip.

15. Piston-cylinder arrangement according to claim 1, characterized in that the screw-in plug has an inner boring extending from its inner end for engaging a rod-shaped component connected to the piston for supporting the magnet, and that this inner boring is constructed as a pocket hole.

16. Piston-cylinder arrangement according to claim 1, characterized in that the inner screw-in end of the screw-in plug has a reduced outer diameter relative to the connecting plug section, and that in the transition area a screw-in stopper is provided.

17. Piston-cylinder arrangement according to claim 16, characterized in that the screw-in plug is made of a magnetically non-conducting material.

18. Piston-cylinder arrangement according to claim 2, wherein electrical plug connections are also housed in the screw-in plug (10).

19. Piston-cylinder arrangement according to claim 3, wherein the plate is cast and connected with the screw-in plug using transparent plastic.

20. Piston-cylinder arrangement according to claim 16, wherein in the transition area, a ring groove for a sealing ring is further provided.

* * * * *